United States Patent
Ishii et al.

(10) Patent No.: US 9,810,965 B2
(45) Date of Patent: Nov. 7, 2017

(54) OPTICAL MODULE

(71) Applicant: Fujitsu Optical Components Limited, Kawasaki-shi, Kanagawa (JP)

(72) Inventors: Akira Ishii, Yokohama (JP); Shinji Maruyama, Sapporo (JP); Masaki Sugiyama, Kawasaki (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 0 days.

(21) Appl. No.: 15/261,112

(22) Filed: Sep. 9, 2016

(65) Prior Publication Data

US 2017/0108757 A1 Apr. 20, 2017

(30) Foreign Application Priority Data

Oct. 20, 2015 (JP) .................................. 2015-206776

(51) Int. Cl.
G02F 1/225 (2006.01)
G02F 1/21 (2006.01)

(52) U.S. Cl.
CPC ............ G02F 1/2255 (2013.01); G02F 1/225 (2013.01); *G02F 2001/212* (2013.01); *G02F 2201/12* (2013.01)

(58) Field of Classification Search
None
See application file for complete search history.

(56) References Cited

U.S. PATENT DOCUMENTS

| 8,135,242 | B2* | 3/2012 | Sugiyama | G02F 1/0316 385/14 |
|---|---|---|---|---|
| 9,231,728 | B2* | 1/2016 | Sugiyama | H04J 14/06 |
| 9,285,650 | B2* | 3/2016 | Sugiyama | G02F 1/2255 |
| 9,316,887 | B2* | 4/2016 | Sugiyama | G02F 1/2255 |
| 9,507,235 | B2* | 11/2016 | Sugiyama | G02F 1/21 |
| 9,571,203 | B2* | 2/2017 | Sugiyama | G02F 1/2255 |
| 2012/0250711 | A1* | 10/2012 | Makino | H01S 5/02292 372/26 |
| 2014/0119686 | A1* | 5/2014 | Sugiyama | G02F 1/2255 385/2 |
| 2014/0119745 | A1* | 5/2014 | Sugiyama | G02F 1/2255 398/188 |

(Continued)

FOREIGN PATENT DOCUMENTS

JP 2005-128440 5/2005

*Primary Examiner* — Michelle R Connelly
(74) *Attorney, Agent, or Firm* — Staas & Halsey LLP

(57) ABSTRACT

An optical module includes an optical modulator that includes a cutout portion and a first terminal projecting to the inside of the cutout portion, and is configured to perform optical modulation by using an electrical signal input to the first terminal; a driver, at least a part of the driver being housed inside the cutout portion, that is configured to generate an electrical signal; an electrode pattern that extends from the driver inside the cutout portion, and is configured to transmit the electrical signal generated by the driver; and a flexible board having flexibility, one end of the flexible board being electrically connected with the first terminal inside the cutout portion, another end of the flexible board extending in the direction away from the driver, the flexible board being connected with the electrode pattern and configured to input the electrical signal transmitted by the electrode pattern to the first terminal.

6 Claims, 3 Drawing Sheets

(56) References Cited

U.S. PATENT DOCUMENTS

| | | | | |
|---|---|---|---|---|
| 2015/0078763 A1* | 3/2015 | Sugiyama | ............... | G02F 1/225 398/200 |
| 2015/0261062 A1* | 9/2015 | Sugiyama | ................ | G02B 6/12 385/14 |
| 2015/0362823 A1* | 12/2015 | Sugiyama | ............... | G02F 1/225 385/3 |
| 2016/0011486 A1* | 1/2016 | Sugiyama | ................. | G02F 1/21 398/188 |
| 2016/0011487 A1* | 1/2016 | Sugiyama | ............... | G02F 1/225 385/3 |
| 2016/0011488 A1* | 1/2016 | Sugiyama | ............. | G02F 1/0121 398/188 |

* cited by examiner

OPTICAL MODULE

CROSS-REFERENCE TO RELATED APPLICATION

This application is based upon and claims the benefit of priority of the prior Japanese Patent Application No. 2015-206776, filed on Oct. 20, 2015, the entire contents of which are incorporated herein by reference.

FIELD

The embodiments discussed herein are related to an optical module.

BACKGROUND

Conventionally, a Mach-Zehnder interferometer has been used for an optical modulator that modulates light emitted from a light source in some cases. In such an optical modulator, signal electrodes and grounding electrodes are arranged along optical waveguides parallel to each other. In recent years, an optical modulation system has been diversified, and the optical modulator has been provided with a plurality of Mach-Zehnder interferometers in many cases. In this case, the Mach-Zehnder interferometers are integrated into one chip, thus enabling the size of the optical modulator to be reduced.

The optical modulator provided with the Mach-Zehnder interferometers inputs therein a plurality of electrical signals that are different from each other, thus enabling generation of a multi-level modulation signal. That is, the electrical signals that are different from each other are input to the respective signal electrodes corresponding to the respective Mach-Zehnder interferometers from the outside of the optical modulator, thus enabling optical modulation by a multi-level modulation system, such as a differential quadrature phase shift keying (DQPSK) system, for example.

There may be a case in which connectors are provided to an input part from which electrical signals are input to the optical modulator. However, if connectors are provided for respective electrical signals, the optical modulator becomes larger in size thus increasing a mounting area for the optical modulator. To address this issue, there may be a case in which a flexible printed circuit board (FPC) having flexibility is used for the input part from which electrical signals are input to reduce the size of a device including the optical modulator.

To be more specific, a plurality of circuit patterns corresponding to the respective signal electrodes of the optical modulator are printed on the FPC, and an electrical signal output from a driver is input to the optical modulator via each circuit pattern printed on the FPC. One end on the optical-modulator side of the FPC is inserted into a cutout portion formed in the optical modulator, and each circuit pattern is, for example, soldered onto a coaxial terminal projecting to the inside of the cutout portion so as to be electrically connected with the optical modulator. On the other hand, one end on the driver side of the FPC, each circuit pattern of which is, for example, soldered onto an electrode pattern for transmitting an electrical signal from the driver, is electrically connected with the driver.

In terms of the reduction in the size of the device, such a structure may be adopted that arranges the optical modulator and the driver hierarchically by using boards that are different from each other to connect the optical modulator and the driver that are hierarchically arranged with each other, by using the FPC (see Japanese Laid-open Patent Publication No. 2005-128440).

However, in the structure in which the optical modulator and the driver that are hierarchically arranged are connected with each other by using the FPC, the arrangement space of the optical modulator and the arrangement space of the driver are separated from each other and hence, there exists the possibility that the entire mounting area of the device increases. Consequently, the structure in which the optical modulator and the driver are hierarchically arranged is unpractical.

It is also possible to adopt such a structure that a part of the driver is housed inside the cutout portion included in the optical modulator to reduce the mounting area corresponding to the driver. However, in this case, the coaxial terminal projecting to the inside of the cutout portion and the driver are arranged in close proximity to each other thus giving rise to a sharp flexure of the FPC that connects the coaxial terminal and the electrode pattern extending from the driver. When the FPC is sharply flexed, unintended stress is applied to the FPC and hence, there exists the possibility that disconnection occurs in the connection portion between the coaxial terminal and the FPC or in the connection portion between the electrode pattern and the FPC.

SUMMARY

According to an aspect of an embodiment, an optical module includes a wiring board; an optical modulator arranged on the wiring board, the optical modulator having a cutout portion and a first terminal projecting to the inside of the cutout portion, the optical modulator being configured to perform optical modulation by using an electrical signal input to the first terminal; a driver arranged on the wiring board, at least a part of the driver being housed inside the cutout portion, the driver being configured to generate an electrical signal; an electrode pattern on the wiring board, the electrode pattern extending from the driver inside the cutout portion, the electrode pattern being configured to transmit the electrical signal generated by the driver; and a flexible board having flexibility, one end of the flexible board being electrically connected with the first terminal inside the cutout portion, another end of the flexible board extending in the direction away from the driver, the flexible board being electrically connected with the electrode pattern and configured to input the electrical signal transmitted by the electrode pattern to the first terminal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. A technique disclosed herein is not limited to the embodiments.

[a] First Embodiment

Figure 1:
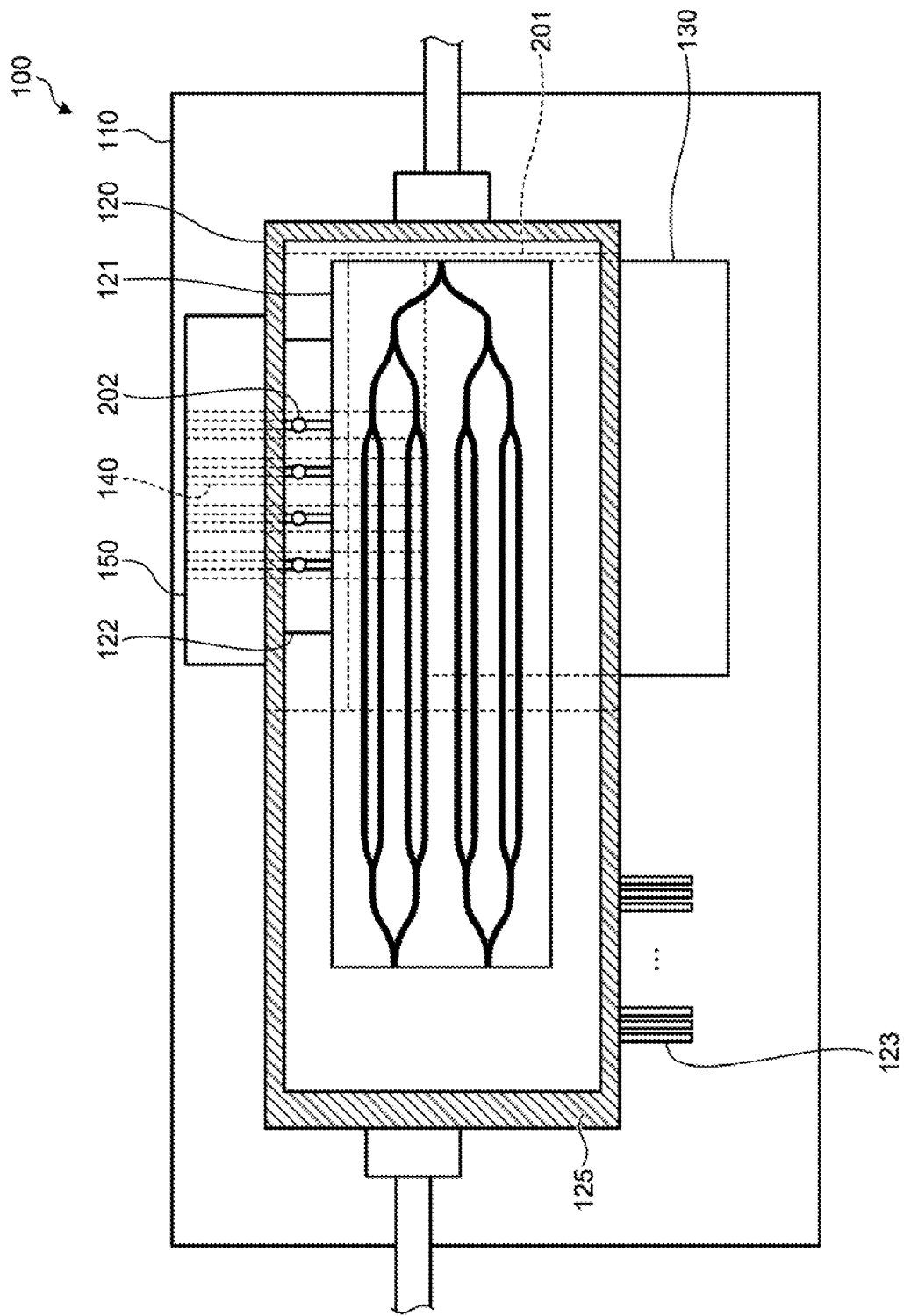
FIG. 1 is a schematic plan view illustrating a constitution of an optical module according to a first embodiment.

FIG. 1 is a schematic plan view illustrating a constitution of an optical module according to the first embodiment. An optical module 100 illustrated in FIG. 1 has a printed circuit board (PCB) 110, an optical modulator 120, a driver 130, an electrode pattern 140, and an FPC 150.

The PCB 110 is a glass epoxy board or the like, and mounts thereon various kinds of parts that constitute the optical module 100. The PCB 110 is one example of a wiring board.

The optical modulator 120 modulates and outputs light emitted from a light source that is not illustrated in the drawings. In this case, the optical modulator 120 performs optical modulation based on an electrical signal output from the driver 130. To be more specific, the optical modulator 120 has, as illustrated in FIG. 1, a package 125, a modulator chip 121 arranged inside the package 125, and a relay board 122. The optical modulator 120 may also have a plurality of direct current (DC) terminals 123 extending from the package 125 to the outside of the package 125.

The modulator chip 121 is constituted of optical waveguides parallel to each other, a signal electrode, and a grounding electrode, and performs optical modulation based on an electrical signal supplied to the signal electrode while the light emitted from the light source is propagating through the optical waveguides. To be more specific, the optical waveguide is formed by thermally diffusing a metal film made of titanium (Ti) or the like, the metal film being formed on a part of a crystal substrate using electro-optic crystals, such as lithium niobate ($LiNbO_3$ (LN)) or lithium tantalate ($LiTaO_2$). Furthermore, the optical waveguide may be formed by proton exchange processing using benzoic acid after patterning. On the other hand, each of the signal electrode and the grounding electrode is a coplanar electrode formed along the corresponding optical waveguide. In FIG. 1, four sets of optical waveguides parallel to each other are formed in the modulator chip 121, and the signal electrode and the grounding electrode corresponding to each optical waveguide are formed. The signal electrode and the grounding electrode are, for example, formed on each optical waveguide by patterning. Furthermore, in order to prevent the light propagating in the optical waveguide from being absorbed by the signal electrode and the grounding electrode, a buffer layer is formed between the crystal substrate and the signal electrode (grounding electrode). As the buffer layer, silicon dioxide (SiO2), the layer of which has a thickness of approximately 0.2 to 2 μm, can be used, for example.

The relay board 122 relays an electrical signal output from the driver 130 to the modulator chip 121, and inputs the electrical signal to the signal electrode of the modulator chip 121. In FIG. 1, the relay board 122 has four circuit patterns corresponding to the respective four signal electrodes formed in the modulator chip 121. Furthermore, the relay board 122 has four coaxial terminals 202 that are electrically connected to the respective four circuit patterns. To consider the case where a plurality of signal electrodes formed in the modulator chip 121 input respective electrical signals thereto, when all input parts from which electrical signals are input are aligned on one side of the optical modulator 120, the optical modulator 120 is easily mounted on the PCB 110 with a small mounting area. Accordingly, in the present embodiment, the relay board 122 is arranged in the optical modulator 120, and the relay board 122 relays the electrical signal input from one side of the optical modulator 120 to the modulator chip 121.

The DC terminal 123 is a terminal for a control signal that controls the modulator chip 121, and is arranged on the side surface from which the driver 130 is exposed, out of the side surfaces of the optical modulator 120. To consider the case where the DC terminals 123 input thereto respective control signals that control the modulator chip 121, when all input parts from which control signals are input are aligned on one side of the optical modulator 120, the optical modulator 120 is easily mounted on the PCB 110 with a small mounting area. Accordingly, in the present embodiment, the DC terminals 123 are arranged on the side surface from which the driver 130 is exposed, and the DC terminal 123 inputs the control signal input from one side of the optical modulator 120 to a DC electrode of the modulator chip 121.

The driver 130 generates an electrical signal for modulating light emitted from the light source. That is, the driver 130 generates a high frequency electrical signal with an amplitude and a phase each corresponding to transmission data, and drives the optical modulator 120 by the electrical signal. A part of the driver 130 is housed in a cutout portion 201 of the package 125 (the cutout portion 201 of the optical modulator 125), the cutout portion 201 being formed in the vicinity of the PCB 110. Consequently, a mounting area corresponding to the driver 130 is reduced.

The electrode pattern 140 is an electrode pattern printed on the PCB 110. In the present embodiment, four electrode patterns 140 corresponding to respective four circuit patterns of the relay board 122 are printed on the PCB 110. The electrode pattern 140 and the circuit pattern of the FPC 150 are soldered to each other. Furthermore, the electrode pattern 140 printed on the PCB 110 extends from the driver 130 inside the cutout portion 201 formed in the optical modulator 120, and transmits the electrical signal output from the driver 130 to the FPC 150.

The FPC 150 is a flexible board having flexibility, and supplies the electrical signal output from the driver 130 to the optical modulator 120. That is, one end of the FPC 150 is electrically connected with the relay board 122 of the optical modulator 120, and the other end of the FPC 150 is electrically connected with the driver 130 via the electrode pattern 140 printed on the PCB 110. The FPC 150 forms a circuit pattern that propagates an electrical signal on the PCB 110-side surface thereof. In the present embodiment, four circuit patterns connected to the respective four circuit patterns printed on the relay board 122 are formed on the FPC 150.

Figure 2:
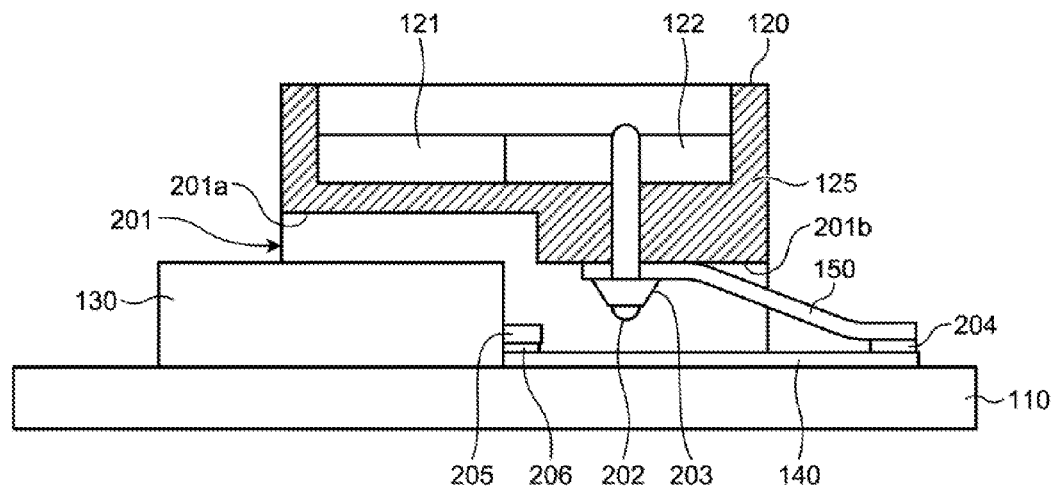
FIG. 2 is a schematic cross sectional view illustrating the constitution of the optical module according to the first embodiment.

Next, with reference to FIG. 2, the explanation is made with respect to electric connections among the optical modulator 120, the driver 130, and the FPC 150. FIG. 2 is a schematic cross sectional view illustrating the constitution of the optical module according to the first embodiment. First of all, the connection portion between the optical modulator 120 and the FPC 150 is explained.

As illustrated in FIG. 2, the cutout portion 201 is formed in the vicinity of the PCB 110 of the package 125 included in the optical modulator 120, and the coaxial terminal 202 projects from the upper surface of the cutout portion 201 to the inside of the cutout portion 201. One end of the FPC 150 is inserted into the cutout portion 201 formed in the optical modulator 120, and electrically connected with the coaxial terminal 202 of the optical modulator 120 inside the cutout portion 201. That is, the coaxial terminal 202 and the circuit pattern of the FPC 150 are soldered to each other and hence, the FPC 150 and the optical modulator 120 are electrically connected with each other.

The coaxial terminal 202 penetrates the relay board 122 in the optical modulator 120 and the upper surface of the cutout portion 201, and projecting to the inside of the cutout portion 201 from the optical modulator 120. The coaxial terminal 202 further penetrates a through hole formed in the FPC 150, and connected with a circuit pattern by way of a solder 203 on the PCB 110-side surface of the FPC 150. Consequently, the optical modulator 120 and the FPC 150 are electrically connected with each other.

The cutout portion 201 has a first surface 201a facing the driver 130 and a second surface 201b facing the electrode pattern 140, the first surface 201a and the second surface 201b constituting the upper surface of the cutout portion 201. The second surface 201b is raised toward the electrode pattern 140 from the first surface 201a set as a reference, and the coaxial terminal 202 projects to the inside of the cutout portion 201 from the second surface 201b. Furthermore, one end of the FPC 150 is inserted into the cutout portion 201 formed in the package 125 of the optical modulator 120, and electrically connected with the coaxial terminal 202 of the optical modulator 120 on the second surface 201b. In this manner, the one end of the FPC 150 is connected with the coaxial terminal 202 of the optical modulator 120 on the second surface 201b that is close to the electrode pattern 140, thus suppressing the flexure of the FPC 150 that connects the coaxial terminal 202 and the electrode pattern 140.

Next, the connection portion between the driver 130 and the FPC 150 is explained. As illustrated in FIG. 2, a part of the driver 130 is housed inside the cutout portion 201 formed in the package 125 of the optical modulator 120, and the electrode pattern 140 formed on the PCB 110 extends from the driver 130 inside the cutout portion 201.

The other end opposite to one end on the coaxial terminal 202-side of the FPC 150 (hereinafter referred merely to the "other end") extends in the direction away from the driver 130, and electrically connected with the electrode pattern 140 on the PCB 110. That is, the circuit pattern of the FPC 150 and the electrode pattern 140 on the PCB 110 are connected with each other by way of a solder 204. Consequently, the driver 130 and the FPC 150 are electrically connected with each other. In the example illustrated in FIG. 2, the other end of the FPC 150 extends in the direction away from the driver 130, and electrically connected with the electrode pattern 140 on the PCB 110 at a position outside the cutout portion 201. In this manner, the other end of the FPC 150 connected with the coaxial terminal 202 at the one end of the FPC 150 extends in the direction away from the driver 130, and connected with the electrode pattern 140 on the PCB 110 thus suppressing the flexure of the FPC 150 that connects the coaxial terminal 202 and the electrode pattern 140.

The driver 130 and the electrode pattern 140 are electrically connected with each other by way of a lead pin 205 projecting from the driver 130, the lead pin 205 being soldered onto the electrode pattern 140. That is, the lead pin 205 projecting from the driver 130 is electrically connected to the electrode pattern 140 by way of a solder 206.

In this manner, according to the present embodiment, a part of the drivers is housed in the cutout portion formed in the optical modulator, one end of the FPC is connected with the coaxial terminal of the optical modulator inside the cutout portion, and the other end of the FPC extends in the direction away from the driver and connected with the electrode pattern extending from the driver. Due to such a constitution, even when the coaxial terminal projecting to the inside of the cutout portion and the driver of which a part is housed in the cutout portion are arranged close to each other, the flexure of the FPC that connects the coaxial terminal and the electrode pattern extending from the driver is suppressed, and an excessive stress is not applied to the FPC. As a result, it is possible to suppress disconnection in the connection portion between the coaxial terminal and the FPC or the connection portion between the electrode pattern and the FPC while reducing the mounting area corresponding to the driver.

[b] Second Embodiment

A technical feature of the second embodiment lies in that a coaxial terminal projecting from a side surface of an optical modulator is provided, one end of an FPC is connected with the coaxial terminal on the side surface of the optical modulator, and the other end of the FPC extending along the side surface of the optical modulator is connected with an electrode pattern extending from a driver.

The constitution of an optical module 100 according to the second embodiment is identical with the case of the first embodiment, and the explanation is omitted. The second embodiment differs from the first embodiment in respect to a position at which the coaxial terminal projects, and the manner of connection between the coaxial terminal and the electrode pattern by way of the FPC.

Figure 3:
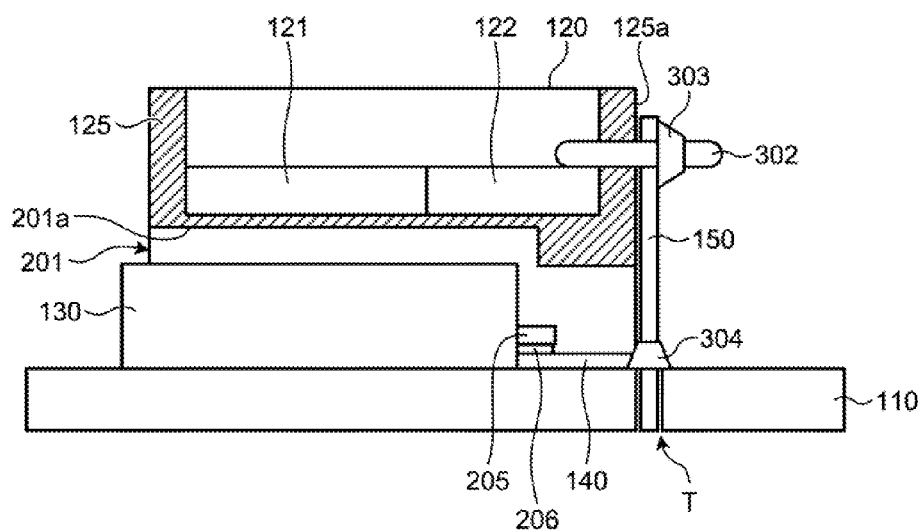
FIG. 3 is a schematic cross sectional view illustrating a constitution of an optical module according to a second embodiment.

FIG. 3 is a schematic cross sectional view illustrating a constitution of the optical module according to the second embodiment. In FIG. 3, parts identical with those illustrated in FIG. 1 and FIG. 2 are given same numerals.

As illustrated in FIG. 3, a coaxial terminal 302 projects from a side surface of a package 125. One end of an FPC 150 is electrically connected with a coaxial terminal 302 projecting from a side surface 125a of the package 125. That is, the coaxial terminal 302 and a circuit pattern of the FPC 150 are soldered to each other and hence, the FPC 150 and an optical modulator 120 are electrically connected with each other.

The coaxial terminal 302 is soldered onto a relay board 122 arranged inside the optical modulator 120, penetrates a side wall of the package 125, and projects from the side surface 125a of the optical modulator 120 in the lateral direction. The coaxial terminal 302 further penetrates a through hole formed in the FPC 150, and connected with the circuit pattern by way of a solder 303 on an opposite surface of the FPC 150 to the optical modulator 120. Consequently, the optical modulator 120 and the FPC 150 are electrically connected with each other.

Furthermore, the other end opposite to one end on the coaxial terminal 302-side of the FPC 150 (hereinafter, merely referred to as the "other end") extends along the side surface 125a of the package 125, and electrically connected with an electrode pattern 140 on a PCB 110. That is, the circuit pattern of the FPC 150 and the electrode pattern 140 on the PCB 110 are connected with each other by way of a solder 304. Consequently, the driver 130 and the FPC 150 are electrically connected with each other. In the example illustrated in FIG. 3, the other end of the FPC 150 extends along the side surface 125a of the package 125, and electrically connected with the electrode pattern 140 on the PCB 110 in a state that the FPC 150 is inserted into a through hole T formed in the PCB 110. In this manner, the other end of the FPC 150 connected with the coaxial terminal 302 at one end of the FPC 150 extends along the side surface 125a of the package 125, and connected with the electrode pattern 140 on the PCB 110 thus suppressing the flexure of the FPC 150 that connects the coaxial terminal 302 and the electrode pattern 140.

In this manner, according to the present embodiment, a part of the driver is housed in the cutout portion formed in the optical modulator, one end of the FPC is connected with the coaxial terminal projecting from the side surface of the package 125, and the other end of the FPC extends along the side surface of the package 125, and connected with the electrode pattern extending from the driver. Due to such a constitution, the flexure of the FPC that connects the coaxial terminal and the electrode pattern extending from the driver is suppressed, and an excessive stress is not applied to the FPC. As a result, it is possible to suppress disconnection in the connection portion between the coaxial terminal and the FPC or the connection portion between the electrode pattern and the FPC while reducing the mounting area corresponding to the driver.

Furthermore, the other end of the FPC extending along the side surface of the optical modulator is connected with the electrode pattern on the PCB in a state that the other end of the FPC is inserted into the through hole formed in the PCB and hence, and thus it is possible to extend the FPC in the vertical direction, and reduce a stress applied to the FPC.

In each embodiment mentioned above, a part of the driver 130 is housed in the cutout portion 201 formed in the package 125. However, the driver 130 may be entirely housed in the cutout portion 201 formed in the optical modulator 120. That is, at least a part of the driver 130 may be housed in the cutout portion 201 formed in the package 125.

Figure 4:
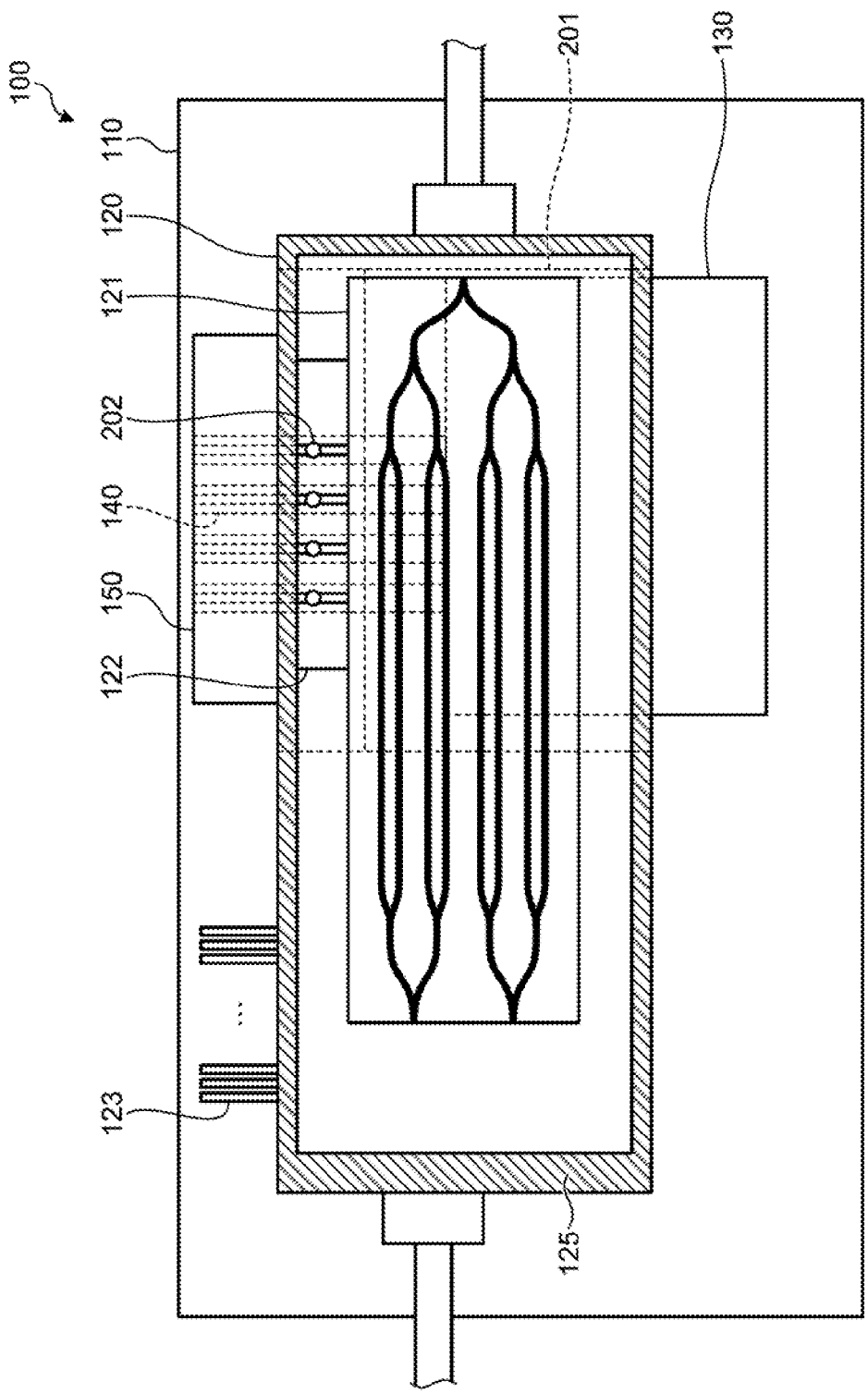
FIG. 4 is a schematic plan view illustrating a constitution of an optical module according to a modification.

Furthermore, in each embodiment mentioned above, the DC terminal 123 is arranged on the side surface from which the driver 130 is exposed, out of the side surfaces of the package 125. However, as illustrated, for example, in FIG. 4, the DC terminal 123 may be arranged on a side surface opposite to the side surface from which the driver 130 is exposed, out of the side surfaces of the package 125. Due to such a constitution, it is possible to avoid the interference of wiring connected to the DC terminal 123 with the driver 130, and improve the optical module in degree of freedom of design.

According to one aspect of the optical module disclosed in the present application, it is possible to achieve the advantageous effect that the disconnection is suppressed while reducing the mounting area.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical module comprising:
a wiring board;
an optical modulator arranged on the wiring board, the optical modulator having a cutout portion and a first terminal projecting to the inside of the cutout portion, the optical modulator being configured to perform optical modulation by using an electrical signal input to the first terminal;
a driver arranged on the wiring board, at least a part of the driver being housed inside the cutout portion, the driver being configured to generate an electrical signal;
an electrode pattern on the wiring board, the electrode pattern extending from the driver inside the cutout portion, the electrode pattern being configured to transmit the electrical signal generated by the driver; and
a flexible board having flexibility, one end of the flexible board being electrically connected with the first terminal inside the cutout portion, another end of the flexible board extending in the direction away from the driver, the flexible board being electrically connected with the electrode pattern and configured to input the electrical signal transmitted by the electrode pattern to the first terminal.

2. The optical module according to claim 1, wherein
the cutout portion has a first surface facing the driver, and a second surface facing the electrode pattern and being raised toward the electrode pattern from the first surface set as a reference,
the first terminal projects to the inside of the cutout portion from the second surface, and
one end of the flexible board is electrically connected with the first terminal on the second surface.

3. The optical module according to claim 1, wherein
a part of the driver is housed inside the cutout portion, and
the optical modulator further comprises a second terminal arranged on a side surface from which the driver is exposed, the side surface being one of side surfaces of the optical modulator.

4. The optical module according to claim 1, wherein
a part of the driver is housed inside the cutout portion, and
the optical modulator further comprises a second terminal arranged on a side surface opposite to a side surface from which the driver is exposed, the side surface opposite to the side surface from which the driver is exposed being one of side surfaces of the optical modulator.

5. An optical module comprising:
an optical modulator having a cutout portion and a first terminal projecting from a side surface of the optical modulator, the optical modulator being configured to perform optical modulation by using an electrical signal input to the first terminal;
a driver, at least a part of the driver being housed inside the cutout portion, the driver being configured to generate an electrical signal;
an electrode pattern extending from the driver inside the cutout portion, the electrode pattern being configured to transmit the electrical signal generated by the driver; and
a flexible board having flexibility, one end of the flexible board being electrically connected with the first terminal on the side surface, another end of the flexible board extending along the side surface and being electrically connected with the electrode pattern, the flexible board configured to input the electrical signal transmitted by the electrode pattern to the first terminal.

6. The optical module according to claim 5, wherein
the optical modulator further includes a board on which the optical modulator, the driver, and the electrode pattern are provided, and
the other end of the flexible board is electrically connected with the electrode pattern in a state that the other end of the flexible board is inserted into a through hole formed in the board.

\* \* \* \* \*